ns Patent Office 3,325,244
Patented June 13, 1967

3,325,244
POTASSIUM PYROPHOSPHATE SOLUTION
Raymond L. Copson, Syracuse, N.Y., assignor to Allied Chemical Corporation, New York, N.Y., a corporation of New York
No Drawing. Filed Sept. 17, 1962, Ser. No. 224,242
6 Claims. (Cl. 23—107)

This invention relates to potassium pyrophosphate solution and more particularly refers to a new and improved process for the production of a concentrated solution of potassium pyrophosphate suitable for use as a base for heavy-duty liquid detergents.

Potassium phosphates generically embrace numerous compounds in which the individual compounds have different properties and uses. Illustrative of these potassium phosphates are monopotassium orthophosphate $(KH_2PO_4)$ dipotassium orthophosphate $(K_2HPO_4)$, tripotassium orthophosphate $(K_3PO_4)$, dipotassium pyrophosphate, $K_2H_2P_2O_7$ tetrapotassium pyrophosphate $(K_4P_2O_7)$, and higher chain phosphates having the general formula $K_{x+2}P_xO_{3x+1}$ in which $x$ represents a whole number of 3 or greater, as illustrated by the specific compounds potassium tripolyphosphate $(K_5P_3O_{10})$, potassium tetrapolyphosphate $(K_6P_4O_{13})$ potassium pentapolyphosphate $(K_7P_5O_{16})$, etc.

Two important commercial uses of potassium phosphate solutions are heavy-duty liquid detergents and liquid fertilizers. Potassium pyrophosphate is a preferred constituent of such solutions because of its very great solubility (over 60% by weight of solution) and its good stability in solution. Orthophosphates are much less soluble. Monopotassium orthophosphate, $KH_2PO_4$, which is the solid phase in equilibrium with neutral orthophosphate solutions, has a solubility of only about 25% (by weight of solution) at room temperature, and tends to "salt out" when solutions containing orthophosphate are chilled to low temperatures as in shipment or storage. In heavy-duty liquid detergents, pyrophosphate is much more effective in promoting detergency than is orthophosphate, and only minor amounts generally not more than 15% and preferably less than 10% of orthophosphate by weight of the total potassium phosphate are desirable in making a good heavy-duty detergent. Higher chain phosphates, i.e. potassium phosphates in which $x$ of the general formula given above is 3 or greater, while having solubility and detergency characteristics comparable to pyrophosphate, are not as stable in solution. Whereas neutral or alkaline solutions of potassium pyrophosphate remain essentially unchanged over a considerable period, higher chain potassium phosphates in solution gradually hydrolyze, and as a result of such hydrolysis the orthophosphate content of the solution gradually increases and may reach undesirably high levels in a short time.

Solutions of potassium pyrophosphates are useful in the manufacture of heavy-duty liquid detergents, in which the potassium phosphate solution is blended with dissolved synthetic organic detergents and other additives. They are also useful in manufacture of solid detergents. Other uses are in water treating and conditioning, or in manufacture of water treating compositions. They may also be used as a base solution for formulating liquid fertilizers.

Pyrophosphates and tripolyphosphates are known compounds and are manufactured by heating alkali metal hydrogen orthophosphates in the solid state at elevated temperature to drive off water of constitution, thus condensing phosphate groups to form phosphoric anhydride linkages. As an example of current practice, the steps in manufacturing a concentrated solution of tetrapotassium pyrophosphate (TKPP) are as follows:

(1) A solution containing orthophosphoric acid $(H_3PO_4)$ is reacted with a solution containing potassium hydroxide (KOH) to prepare a solution containing dipotassium hydrogen orthophosphate $(K_2HPO_4)$.

(2) The solution is dried to obtain solid dipotassium hydrogen orthophosphate.

(3) The solid is heated at 400° to 500° C. to drive off water of constitution, thereby causing condensation of two orthophosphate molecules to form one pyrophosphate molecule:

$2K_2HPO_{4(solid)} \rightarrow K_4P_2O_{7(solid)} + H_2O_{(gas)}$ (4) The cooled solid product is dissolved in a limited amount of water to obtain the desired concentrated solution.

Thus it will be evident that the conventional method of manufacturing TKPP solutions is cumbersome and complicated and represents large investment and operating costs.

An object of the present invention is to provide an efficient economical process for production of a concentrated solution of potassium pyrophosphate suitable for use as a base for heavy-duty liquid detergents, or for liquid fertilizers. Other objects and advantages will be apparent from the following description.

Superficially a most convenient method of producing potassium pyrophosphate solution would be by simple mixing of a solution containing pyrophosphoric acid with a solution containing potassium hydroxide. The difficulty lies in preparation of the solution of pyrophosphoric acid.

In U.S. Patent 3,022,154 of Feb. 20, 1962, a method is described for producing a solution of potassium phosphates in which potassium hydroxide solution is mixed with "superphosphoric acid," a liquid form of phosphoric acid containing from about 75 to 77 percent $P_2O_5$. Acid in this range of composition is a liquid mixture in which about 56 to 40% of the total phosphate is present as orthophosphoric acid, about 39 to 47 percent as pyrophosphoric acid, about 5 to 11 percent as tripolyphosphoric acid, and up to about 2 percent as tetrapolyphosphoric acid. Corresponding to the composition of the acid, the resultant potassium phosphate solution contained a mixture of phosphates, in which the pyrophosphate content amounted to less than one-half of the total phosphate.

The present invention is particularly directed to the production of a concentrated potassium phosphate solution in which the major constituent is potassium pyrophosphate and the solution contains less than 15% preferably not more than 10% of potassium orthophosphate by weight of the total potassium phosphate content in the solution.

In accordance with the present invention a concentrated solution of potassium phosphate containing as a major constituent potassium pyrophosphate and minor amounts of potassium orthophosphate and higher potassium polyphosphates can be produced by mixing liquid phosphoric acid containing 78 to 81% $P_2O_5$ preferably 79.8±0.5% $P_2O_5$ with a granular mass of previously prepared substantially solid pyrophosphoric acid, in the proportion of 1–7 parts of solid per part of liquid phosphoric acid, preferably 2–4 parts solid per part of liquid phosphoric acid, maintaining the temperature during mixing below 50° C. preferably within the range of 20–35° C. and continuing mixing until the resultant mixture is a substantially dry granular solid, returning a portion of said dry solid for admixture with additional phosphoric acid to produce additional dry solid, reacting the dry solid with an aqueous solution of potassium hydroxide containing about 40–65% KOH preferably about 50–57% KOH in the proportion of about 1 part of solid acid to about 1.4–3.2 parts of KOH liquor, regulating the proportion of said solid acid and potassium hydroxide so as to maintain the pH of said reaction mixture above 7.0 and maintaining the temperature of the reaction mixture during reaction within the range of about 20 to 110° C. preferably within the range of about 45–70° C.

Phosphoric acid of high $P_2O_5$ concentration may be obtained by dissolving solid phosphorus pentoxide ($P_2O_5$) in ordinary commercial grades of phosphoric acid to bring the concentration up to the desired range. It is also possible to concentrate more dilute grades of phosphoric acid in a vacuum evaporator. Phosphoric acid of the required composition can also be made in a phosphoric acid plant in which electric furnace (elemental) phosphorus is burned. Polyphosphoric acid containing 83–84% $P_2O_5$ as well as more dilute phosphoric acids are available commercially. In the process of the present invention, liquid phosphoric acid containing 78 to 81% $P_2O_5$ preferably 79.8±0.5% $P_2O_5$ is required. Acid of this strength may be made directly by the methods previously outlined. However, if commercial acid of higher strength is used, the composition can be adjusted to that specified by addition of water, and similarly if more dilute acid is available its concentration can be increased to the desired range by dissolving solid phosphorus pentoxide in the more dilute acid.

Liquid phosphoric acid containing from 78 to 81% $P_2O_5$ consists of mixtures in which pyrophosphoric acid predominates. In this range about 30 to 11% of the total phosphate is present as orthophosphoric acid, about 49 to 33% as pyrophosphoric acid, about 16 to 25% as tripolyphosphoric acid, and about 5 to 31% as tetrapolyphosphoric and higher chain acids. It is known that pyrophosphoric acid may crystallize at room temperature from liquid acids in this composition range. It is also known that these acids are "reorganizing liquids," so that when solid pyrophosphoric acid crystallizes the constitution of the residual liquor adjusts to restore a condition of equilibrium. Starting with liquid acid having exactly the $P_2O_5$ content of pyrophosphoric acid, namely 79.8% $P_2O_5$, it is theoretically possible to convert completely to solid, crystalline pyrophosphoric acid. However, liquid phosphoric acids in this composition range are viscous, syrupy liquids in which it is difficult to induce crystallization. Once started, crystallization generally is slow and incomplete. Separation of crystals from the viscous residual liquor is difficult. Hence a practical, inexpensive process for production of pyrophosphoric acid or a solution of pyrophosphoric acid has not heretofore been available. We have found a method of converting liquid phosphoric acid containing 78 to 81% $P_2O_5$ preferably 79.8±0.5% $P_2O_5$ to a substantially dry, granular solid which solid when reacted with KOH liquor produces a solution containing over 85% by weight of the total potassium phosphates as potassium pyrophosphate with minor amounts about 10% or less as potassium orthophosphate and about 5% or less as potassium chain phosphates higher than potassium pyrophosphate. Such solution is eminently suitable for use in heavy-duty detergents. We have found that liquid acid containing about 79.8% $P_2O_5$ can be converted readily to crystalline granular pyrophosphoric acid by agitating liquid phosphoric acid with a granular mass of previously prepared solid pyrophosphoric acid in any suitable mixer, e.g. a dry-type mixer, until the resultant product is a dry granular solid. To initiate the reaction solid pyrophosphoric acid from an external source may be employed. Ordinarily the conversion to dry, granular solid will be accomplished in about 1 hour. It is important that the temperature of mixing should not exceed about 50° C. or else a dry granular solid will not result. Excess heat may be generated during mixing and it is therefore advisable to equip the dry mixer with suitable cooling means to control the temperature. Temperatures well below 50° C. may be employed but in practice it is not desirable to go below about 0° C. Good results were obtained at a temperature within the range of about 20–35° C. The amount of solid pyrophosphoric acid should be at least equal to the amount by weight of liquid phosphoric acid and is preferably about 2–4 times the quantity of liquid phosphoric acid. A large proportion of solid pyrophosphoric acid may be employed but no material advantage is gained by using amounts greater than 6–8 times the quantity of liquid phosphoric acid. A dry atmosphere maintained over the mixer during the entire operation aids in preventing undue absorption of moisture by the acid.

The other raw material for the process of the present invention is caustic potash liquor containing about 40–65% KOH preferably about 50–57% KOH. Temperature of the liquor is that required to keep it from solidifying, and may range from room temperature for 55% KOH up to 110° C. or higher for 65% KOH.

The operation of the present invention may be carried out in a batch or continuous manner. In a continuous process, a stainless steel shaft mixer could be used, equipped with a water jacket for cooling. At the feed end, 1 part of liquid phosphoric acid containing 78 to 81% $P_2O_5$ preferably 79.8±0.5% $P_2O_5$ would be mixed with 3 parts of recycled solid acid. At the discharge end the solid product would be divided with 3 parts being recycled and one part going forward.

Solid pyrophosphoric acid from the mixer, is then reacted wth KOH liquor. Reaction may be continuous or batch-wise. In batch operation, a charge of caustic potash liquor is placed in a mixing tank equipped with agitator and cooling coils. Solid pyrophosphoric acid is added gradually, mixing continued until the reaction is complete. The finished pH value of the reaction mixture may be in the range from about 7 to 13. Proportions are in the range of 1 part solid acid to 1.4–3.2 parts of KOH liquor the exact ratio depending upon concentration of the KOH. Temperature and time are not critical but typically the temperature is controlled at about 65° C. and mixing time per batch is about 1 hour. The finished solution is cooled to about room temperature, and then sent to storage, shipment or use.

The following example illustrates the present invention.

Liquid polyphosphoric acid containing 83.4% $P_2O_5$ was reacted with sufficient water to bring the composition to 79.8% $P_2O_5$. About 15 minutes was allowed for reaction. About 20 parts by weight of the liquid acid was added to the dry mixer which contained about 60 parts of solid pyrophosphoric acid previously prepared, and agitated for one hour at 30° C. About 20 parts of the dry product was removed from the mixer, and added gradually to about 52 parts of 50% KOH liquor in a wet-type mixer. The finished solution had a pH of about 13.

Chemical analysis of the solution is shown in columns 1 and 2 below:

| | Physical Form of Acid Used | | | |
|---|---|---|---|---|
| | Solid | | Liquid | |
| | Column | | | |
| | 1 | 2 | 3 | 4 |
| | Percent in Soln. | Percent basis total pot. phosphates | Percent in Soln. | Percent basis total pot. phosphates |
| Potassium orthophosphate | 4.4 | 8 | 13.7 | 25 |
| Potassium pyrophosphate | 48.3 | 89 | 24.5 | 44 |
| Potassium tripolyphosphate and higher potassium polyphosphates | 1.6 | 3 | 17.6 | 31 |
| Total potassium phosphates | 54.3 | 100 | 55.8 | 100 |

For comparison, columns 3 and 4 above show the analysis of a potassium phosphate solution made by reacting liquid pyrophosphoric acid directly with KOH liquor. Thus, when reacting solid pyrophosphoric acid with hot KOH liquor in accordance with the present invention over 85% of the total phosphate in the product solution was present as tetrapotassium pyrophosphate. Whereas when reacting liquid pyrophosphoric acid with KOH liquor there was produced a mixture of potassium phosphates in which potassium phosphates other than potassium pyrophosphate constituted over 55% of the phosphates and the potassium pyrophosphate content based on the total potassium phosphate was only 44%.

Although certain preferred embodiments of the invention have been disclosed for purpose of illustration, it will be evident that various changes and modifications may be made therein without departing from the scope and spirit of the invention.

I claim:

1. A process for the production of an aqueous solution of potassium phosphate containing potassium pyrophosphate as the major phosphate constituent and only minor amounts of potassium orthophosphate and higher potassium polyphosphates which comprises mixing liquid phosphoric acid containing 78 to 81% $P_2O_5$ with a granular mass of previously prepared solid pyrophosphoric acid in the proportion of 1–7 parts of solid pyrophosphoric acid per part of liquid phosphoric acid, maintaining the temperature during mixing below 50° C. and continuing mixing until the resultant mixture is a substantially dry, granular solid, returning a portion of the dry, granular solid for admixture with additional liquid phosphoric acid to produce additional dry, granular solid, admixing the dry, granular solid with an aqueous solution of potassium hydroxide containing about 40–65% KOH in the proportion of about 1 part solid acid to about 1.4–3.2 parts KOH liquor, regulating the proportion of said solid acid and potassium hydroxide so as to maintain the pH of said reaction mixture above 7.0 and maintaining the temperature of the reaction mixture during reaction within the range of 20–110° C.

2. A process for the production of an aqueous solution of potassium phosphate containing potassium pyrophosphate as the major phosphate constituent and only minor amounts of potassium orthophosphate and higher potassium polyphosphates which comprises mixing liquid phosphoric acid containing 79.8±0.5% $P_2O_5$ with a granular mass of previously prepared solid pyrophosphoric acid in the proportion of 2–4 parts of solid pyrophosphoric acid per part of liquid phosphoric acid, maintaining the temperature during mixing within the range of 20–35° C. and continuing mixing until the resultant mixture is a dry, granular solid, returning a portion of the dry, granular solid for admixture with additional liquid phosphoric acid to produce additional dry, granular solid, admixing the dry, granular solid with an aqueous solution of potassium hydroxide containing about 50–57% KOH in the proportion of about 1 part solid acid to about 1.6–2.5 parts KOH liquor, regulating the proportion of said solid acid and potassium hydroxide so as to maintain the pH of said reaction mixture above 7.0 and maintaining the temperature of the reaction mixture during reaction within the range of 45–70° C.

3. A method for the production of a dry, granular solid acid composition composed essentially of pyrophosphoric acid which comprises mixing liquid phosphoric acid containing 78 to 81% $P_2O_5$ with a granular mass of previously prepared solid pyrophosphoric acid in the proportion of 1–7 parts of solid pyrophosphoric acid per part of liquid phosphoric acid, maintaining the temperature during mixing below 50° C. and continuing mixing until the resultant mixture is a substantially dry, granular solid, and returning a portion of the dry, granular solid for admixture with additional liquid phosphoric acid to produce additional dry, granular solid.

4. A method for the production of a dry, granular solid acid composition composed essentially of pyrophosphoric acid which comprises mixing liquid phosphoric acid containing 79.8±0.5% $P_2O_5$ with a granular mass of previously prepared solid pyrophosphoric acid in the proportion of 2–4 parts of solid pyrophosphoric acid per part of liquid phosphoric acid, maintaining the temperature during mixing within the range of 20–35° C. and continuing mixing until the resultant mixture is a dry, granular solid, and returning a portion of the dry, granular solid for admixture with additional liquid phosphoric acid to produce additional dry, granular solid.

5. A dry, granular solid acid composition composed essentially of pyrophosphoric acid prepared by mixing liquid phosphoric acid containing 78 to 81% $P_2O_5$ and 19 to 22% water with a granular mass of previously prepared solid pyrophosphoric acid in the proportion of 1–7 parts of solid pyrophosphoric acid per part of liquid phosphoric acid, maintaining the temperature during mixing below 50° C. and continuing mixing until the resultant mixture is a substantially dry, granular solid.

6. A composition as claimed in claim 5 wherein the liquid phosphoric acid contains 79.8±0.5% $P_2O_5$ and 20.2±0.5% water.

References Cited

UNITED STATES PATENTS

| | | | |
|---|---|---|---|
| 1,336,974 | 4/1920 | Levin | 23—139 |
| 1,815,581 | 7/1931 | Pauckner et al. | 23—165 |
| 2,128,182 | 8/1938 | Fiske | 23—165 |
| 2,133,286 | 10/1938 | Fiske | 23—109 |
| 2,338,407 | 1/1944 | Coleman et al. | 23—165 |
| 2,811,419 | 10/1957 | Hartlopp et al. | 23—107 |
| 3,022,154 | 2/1962 | Potts et al. | 71—34 |
| 3,057,711 | 10/1962 | Reusser et al. | 71—43 |
| 3,192,013 | 6/1965 | Young | 23—165 |
| 3,228,752 | 1/1966 | Hignett et al. | 23—107 |

OTHER REFERENCES

Mellor, J. W.—"A Comprehensive Treatise On Inorganic and Theoretical Chemistry," vol. 8, pp. 971–976, Longmans, Green & Co., London, 1947.

Shreve—"Selected Process Industries," p. 323, McGraw-Hill, Inc., New York, 1950.

Van Wazer—"Phosphorus and Its Compounds," vol. 1, pp. 617–626, 770–777, Interscience, New York, 1958.

OSCAR R. VERTIZ, *Primary Examiner.*

O. F. CRUTCHFIELD, *Assistant Examiner.*